(12) United States Patent
Kimura et al.

(10) Patent No.: US 11,128,569 B2
(45) Date of Patent: Sep. 21, 2021

(54) LOAD DISTRIBUTION SYSTEM AND LOAD DISTRIBUTION METHOD

(71) Applicant: Nippon Telegraph and Telephone Corporation, Tokyo (JP)

(72) Inventors: Akihiro Kimura, Tokyo (JP); Hideaki Iwata, Tokyo (JP); Akihiro Okada, Tokyo (JP); Hideo Tsuchiya, Tokyo (JP); Shunsuke Homma, Tokyo (JP); Katsuma Miyamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/971,848

(22) PCT Filed: Feb. 6, 2019

(86) PCT No.: PCT/JP2019/004266
§ 371 (c)(1),
(2) Date: Aug. 21, 2020

(87) PCT Pub. No.: WO2019/163518
PCT Pub. Date: Aug. 29, 2019

(65) Prior Publication Data
US 2021/0014165 A1    Jan. 14, 2021

(30) Foreign Application Priority Data
Feb. 23, 2018    (JP) .............................. JP2018-030587

(51) Int. Cl.
*H04L 12/803*    (2013.01)
*H04L 12/851*    (2013.01)
*H04L 12/801*    (2013.01)
*H04L 12/863*    (2013.01)

(52) U.S. Cl.
CPC ........ *H04L 47/125* (2013.01); *H04L 47/2441* (2013.01); *H04L 47/2483* (2013.01); *H04L 47/29* (2013.01); *H04L 47/628* (2013.01)

(58) Field of Classification Search
CPC ............... H04L 47/125; H04L 47/2441; H04L 47/2483; H04L 47/28; H04L 47/628
See application file for complete search history.

(56) References Cited

U.S. PATENT DOCUMENTS

2016/0191392 A1*  6/2016  Liu ....................... H04L 47/125
                                                                    370/235

FOREIGN PATENT DOCUMENTS

JP    2004350078    12/2004

* cited by examiner

*Primary Examiner* — Siming Liu
(74) *Attorney, Agent, or Firm* — Fish & Richardson P.C.

(57) ABSTRACT

A load distribution system has: determination means for determining, upon an input port receiving a packet, a flow attribute indicating whether a flow configured by the packet is a flow that tends to include many long packets or a flow that tends to include many short packets; and output means for outputting the packet to a packet transfer device in a load state indicating that a load applied by the flow of the flow attribute is low, of a plurality of packet transfer devices, in accordance with the flow attribute determined by the determination means.

16 Claims, 10 Drawing Sheets

Fig. 3

| DESTINATION NETWORK | SUBNET MASK | GATEWAY LIST | OUTPUT PORT INFORMATION | LOAD STATE IN TERMS OF DATA VOLUME (BPS) | LOAD STATE IN TERMS OF NUMBER OF PACKETS (PPS) |
|---|---|---|---|---|---|
| default | - | 192.168.1.0 | eth0 | 0 | 1 |
| | | 192.168.1.1 | eth1 | 0 | 0 |
| | | 192.168.1.2 | eth2 | 1 | 0 |
| 10.0.0.0 | 255.255.255.0 | 192.168.1.3 | eth3 | 0 | 1 |
| ... | ... | ... | ... | ... | ... |

(Columns "OUTPUT PORT INFORMATION", "LOAD STATE IN TERMS OF DATA VOLUME (BPS)", "LOAD STATE IN TERMS OF NUMBER OF PACKETS (PPS)" constitute PATH INFORMATION)

Table 1000

LOAD DISTRIBUTION SYSTEM AND LOAD DISTRIBUTION METHOD

CROSS-REFERENCE TO RELATED APPLICATIONS

This application is a National Stage application under 35 U.S.C. § 371 of International Application No. PCT/JP2019/004266, filed on Feb. 6, 2019, which claims the benefit of Japanese Patent Application No. 2018-030587, filed on Feb. 23, 2018. The disclosures of the prior applications are incorporated by reference in their entirety.

TECHNICAL FIELD

The present invention relates to a load distribution system and a load distribution method.

BACKGROUND ART

A technology for distributing the load on packet transfer devices, such as routers, has been conventionally known. For example, a technology is known in which a plurality of packet transfer devices, which serve as packet transfer destinations, and a plurality of transfer paths are prepared, and the load on the packet transfer devices is distributed by evenly applying traffic to the transfer paths. A technology called ECMP (Equal Cost Multi Path) or ECMP routing is also known as such a load distribution technology. ECMP is a load distribution technology in which traffic is evenly applied to equal-cost transfer paths, of the aforementioned plurality of transfer paths.

Furthermore, a technology is known in which, in a load distribution system that uses ECMP, an output buffer of an output physical port of a packet transfer device is monitored, and the transfer path is switched if the utilization or the packet flow of the output buffer exceeds a threshold (e.g. Patent Literature 1).

CITATION LIST

Patent Literature

[PTL 1] Japanese Patent Application Publication No. 2004-350078

SUMMARY OF THE INVENTION

Technical Problem

Indexes of transfer capacity of a packet transfer device include transfer capacity in terms of data volume that is indicated in units of bps (bits per second) and transfer capacity in terms of the number of packets that is indicated in units of pps (packets per second). Also, the transfer capacity has an upper limit value that is unique to each packet transfer device. For example, if a packet transfer device is realized by a network virtualization technology, bps may be determined by the line rate of a physical NIC (Network Interface Card), and pps may be determined by the packet processing speed of software such as an OS (Operating System) or an application.

However, the aforementioned conventional technology does not consider characteristics of traffic. For this reason, if, for example, there in an inclination to a specific characteristic in the traffic applied to the packet transfer device, there may be cases where the transfer capacity of this packet transfer device cannot be fully utilized.

For example, the traffic of moving images or the like has a characteristic that the traffic includes many long packets. For this reason, if traffic of moving images or the like is concentrated, a state is entered where the transfer capacity in terms of data volume is exhausted, whereas transfer capacity still remains in terms of the number of packets. On the other hand, for example, traffic of VoIP (Voice over Internet Protocol) or telemetering has a characteristic that the traffic includes many short packets. For this reason, if traffic of VoIP, telemetering, or the like is concentrated, a state is entered where transfer capacity still remains in terms of data volume, whereas the transfer capacity in terms of the number of packets is exhausted.

In this regard, the tendency regarding the packet length (i.e. which is greater of the number of short packets and the number of long packets) in a certain traffic flow can be roughly estimated based on the type of an application that handles this flow.

An embodiment of the present invention has been made with the foregoing in view, and an object thereof is to realize load distribution corresponding to a characteristic of a flow.

Means for Solving the Problem

To achieve the above-stated object, the embodiment of the present invention includes: determination means for determining, upon an input port receiving a packet, a flow attribute indicating whether a flow configured by the packet is a flow that tends to include many long packets or a flow that tends to include many short packets; and output means for outputting the packet to a packet transfer device in a load state indicating that a load applied by the flow of the flow attribute is low, of a plurality of packet transfer devices, in accordance with the flow attribute determined by the determination means.

Effects of the Invention

An object is to realize load distribution corresponding to a characteristic of a flow.

BRIEF DESCRIPTION OF DRAWINGS

FIG. 3 is a diagram showing an example of an ECMP path table according to Example 1.

DESCRIPTION OF EMBODIMENTS

Hereinafter, the embodiment of the present invention will be described. The embodiment of the present invention will describe a load distribution system 1 in which load distribution is carried out in accordance with a characteristic of a flow. In the following description, a characteristic of a flow will be referred to as a "flow attribute", and the flow attribute is a "high-bps flow", which indicates a flow that includes many long packets, or a "high-pps flow", which indicates a flow that includes many short packets. Here, a "flow" refers to packets (traffic) or packet groups with the same flow information. "Flow information" is specified by header information contained in a packet, and refers to, for example, 5-tuple (transmission source IP (Internet Protocol) address, destination IP address, transmission source port number, destination port number, and protocol type).

Note that applications that handle flows with many long packets may include a moving image browser application and the like, for example. Meanwhile, applications that handle flows many short packets may include a voice call application that uses VoIP, an application for telemetering, and the like, for example.

Overall Configuration

Figure 1:
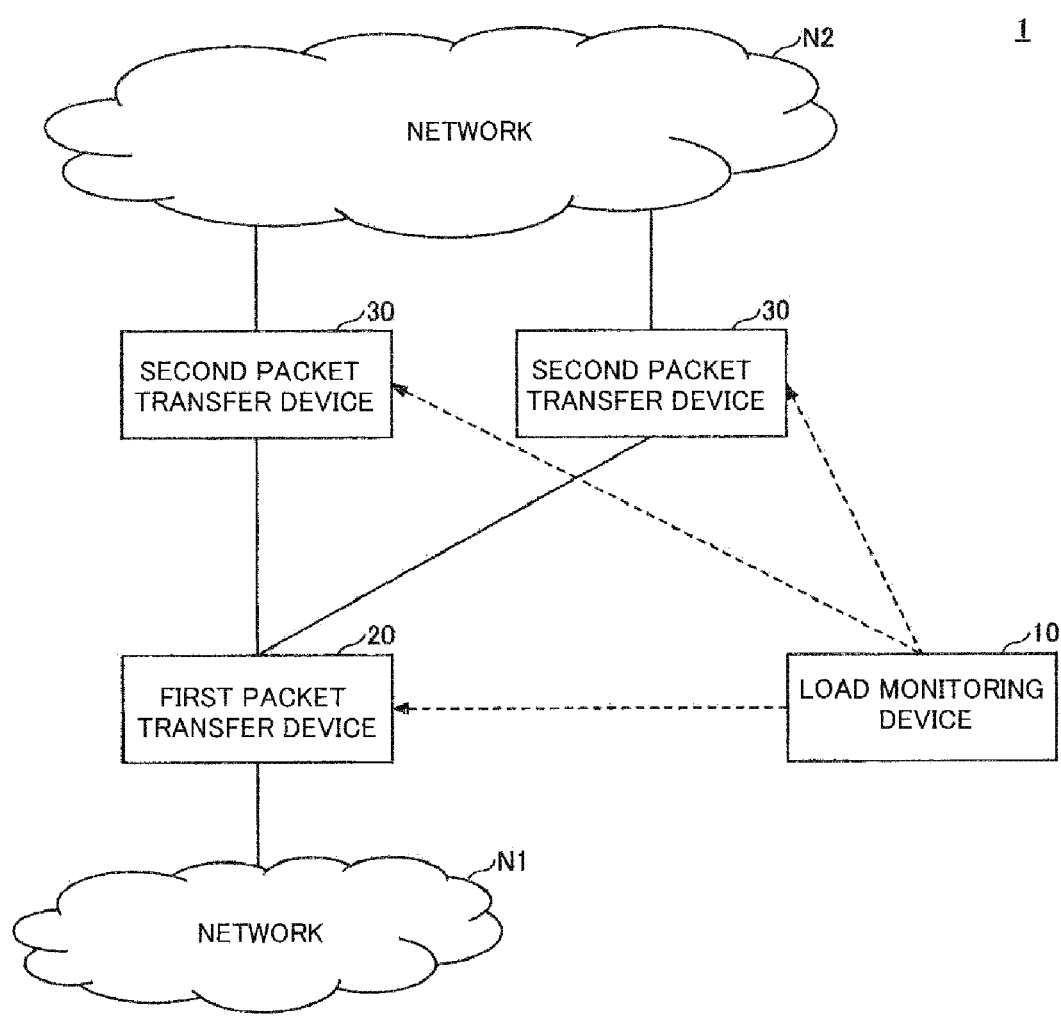
FIG. 1 is a diagram showing an example of an overall configuration of a load distribution system according to the embodiment of the present invention.

First, an overall configuration of the load distribution system 1 according to the embodiment of the present invention will be described with reference to FIG. 1. FIG. 1 shows an example of an overall configuration of the load distribution system 1 according to the embodiment of the present invention.

As shown in FIG. 1, the load distribution system 1 according to the embodiment of the present invention includes a load monitoring device 10, a first packet transfer device 20, and second packet transfer devices 30.

The load monitoring device 10 is, for example, a computer, a computer system, or the like, and monitors the traffic flow rate at the second packet transfer devices 30, which are subjected to load distribution. If the traffic flow rate at the second packet transfer devices 30 exceeds a predetermined threshold (or falls below a predetermined threshold), the load monitoring device 10 transmits a command to carry out load distribution (or cancel load distribution) to the first packet transfer device 20.

The first packet transfer device 20 is a router or the like, for example, and transfers a packet from a network N1 side to any of the second packet transfer devices 30. At this time, the first packet transfer device 20 references a predetermined table, which is used in load distribution, and transfers the packet to a second packet transfer device 30 appropriate for the flow attribute, of a plurality of second packet transfer devices 30.

Also, the first packet transfer device 20 changes the predetermined table used in load distribution, in accordance with a command from the load monitoring device 10.

Each of the second packet transfer devices 30 is a router or the like, for example, and transfers a packet transferred from the first packet transfer device 20 to a network N2 side. In the following description, when the plurality of second packet transfer devices 30 are distinguished from each other, the respective second packet transfer devices 30 will be referred to as "a second packet transfer device 30-1", "a second packet transfer device 30-2", and so on.

Note that the configuration of the load distribution system 1 shown in FIG. 1 is an example, and may alternatively be another configuration. For example, the first packet transfer device 20 and the second packet transfer devices 30 may alternatively be virtual routers or the like that are constructed on a computer or the like by means of a network virtualization technology.

Example 1

Example 1 of the load distribution system 1 according to the embodiment of the present invention will be described below.

Functional Configuration

Figure 2:
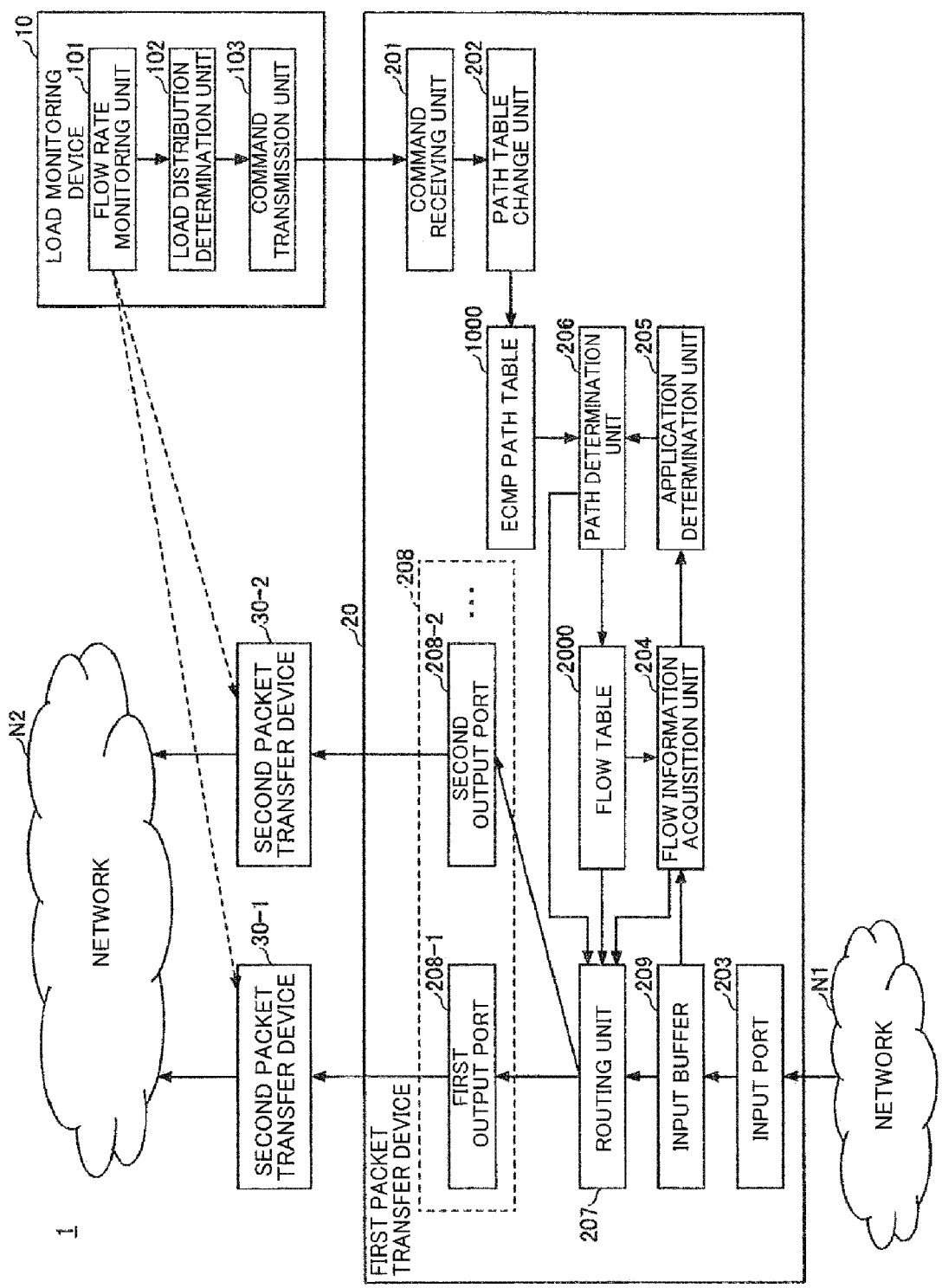
FIG. 2 is a diagram showing an example of a functional configuration of a load distribution system according to Example 1.

First, a functional configuration of the load distribution system 1 according to Example 1 will be described with reference to FIG. 2. FIG. 2 shows an example of a functional configuration of the load distribution system 1 according to Example 1.

As shown in FIG. 1, the load monitoring device 10 according to Example 1 has a flow rate monitoring unit 101, a load distribution determination unit 102, and a command transmission unit 103.

The flow rate monitoring unit 101 monitors the traffic flow rates at the second packet transfer devices 30 in terms of both data volume (bps) and the number of packets (pps), based on statistical information regarding the second packet transfer devices 30. That is to say, the flow rate monitoring unit 101 obtains the data volume (bps) and the number of packets (pps) as the results of monitoring the second packet transfer devices 30. In the following description, the data volume (bps) obtained as a monitoring result will be referred to as a "bps result value", and the number of packets (pps) obtained as a monitoring result will be referred to as a "pps result value".

The load distribution determination unit 102 determines whether to carry out or cancel load distribution. That is to say, the load distribution determination unit 102 determines whether the bps result value exceeds or falls below a preset bps threshold. Similarly, the load distribution determination unit 102 determines whether the pps result value exceeds or falls below a preset pps threshold.

If it is determined that the bps result value exceeds the bps threshold, the load distribution determination unit 102 determines to carry out load distribution. On the other hand, if it is determined that the bps result value falls below the bps threshold, the load distribution determination unit 102 determines to cancel load distribution.

Similarly, if it is determined that the pps result value exceeds the pps threshold, the load distribution determination unit 102 determines to carry out load distribution. On the other hand, if it is determined that the pps result value falls below the pps threshold, the load distribution determination unit 102 determines to cancel load distribution.

If it is determined to carry out load distribution or to cancel load distribution by the load distribution determination unit 102, the command transmission unit 103 transmits a predetermined command to the first packet transfer device 20.

Here, a command includes a "threshold type", a "command type", and "target device identification information". The "threshold type" refers to the type of threshold that the monitoring result exceeds or falls below, and either information indicating the bps threshold or information indicating the pps threshold is set as the "threshold type". Information indicating whether to carry out or cancel load distribution is set as the "command type". The "target device identification information" refers to identification information regarding the second packet transfer device 30 whose monitoring result exceeds or falls below the threshold, and an IP address of this second packet transfer device 30 is set as the "target device identification information", for example. However, for example, an ID, a MAC (Media Access Control) address, a host name, and the like of the second packet transfer device 30 may also be set as the "target device identification information", in addition to the IP address.

As shown in FIG. 1, the first packet transfer device 20 according to Example 1 has a command receiving unit 201, a path table change unit 202, an input port 203, a flow information acquisition unit 204, an application determination unit 205, a path determination unit 206, a routing unit 207, output ports 208, and an input buffer 209. These functional units are realized by processing that one or more programs installed on the first packet transfer device 20 cause a CPU or the like to perform, for example.

The command receiving unit 201 receives a command from the load monitoring device 10. The path table change unit 202 changes an ECMP path table 1000 in accordance with the command received by the command receiving unit 201. The ECMP path table 1000 is a table that stores pieces of path information as entries. Note that the ECMP path table 1000 is stored in an auxiliary storage device, a dedicated memory device, or the like, for example. The details of the ECMP path table 1000 according to Example 1 will be described later.

The input port 203 receives a packet from the network N1 side. The input port 203 then stores the received packet in the input buffer 209. Note that the input buffer 209 is a storage area for temporarily storing the received packet, and is realized by a RAM (Random Access Memory), an auxiliary storage device, a dedicated memory device, or the like, for example.

The flow information acquisition unit 204 generates a hash value based on flow information (e.g. 5-tuple) regarding a packet stored in the input buffer 209. Also, the flow information acquisition unit 204 references a flow table 2000, and determines whether or not an entry including a hash value that coincides with the generated hash value exists. The flow table 2000 is a table that stores, as entries, pieces of flow transfer information in which hash values and information indicating the output ports 208 (output port information) are associated with each other. The output port information is information for specifying one of a plurality of output ports 208. Note that the flow table 2000 is stored in a RAM, an auxiliary storage device, a dedicated memory device, or the like, for example.

If it is determined that a corresponding entry exists, the flow information acquisition unit 204 notifies the routing unit 207 of this entry. On the other hand, if it is determined that no corresponding entry exists, the flow information acquisition unit 204 determines that this packet is a packet in a new flow, and notifies the application determination unit 205 that no corresponding entry exists. At this time, for example, the flow information acquisition unit 204 notifies the application determination unit 205 of 5-tuple or L7 information (e.g. L7 header information etc.) regarding this packet, and the hash value.

Note that entries (flow transfer information) stored in the flow table 2000 may be deleted (cleared) every predetermined time by the path determination unit 206 or the like, for example.

In accordance with the notification from the flow information acquisition unit 204, the application determination unit 205 specifies an application for the new flow using 5-tuple or L7 information, and specifies the flow attribute of the new flow (either a high-bps flow or a high-pps flow). The application determination unit 205 then notifies the path determination unit 206 of the specified flow attribute. At this time, the application determination unit 205 notifies the path determination unit 206 of 5-tuple, the flow attribute, and the hash value, for example.

The path determination unit 206 references the ECMP path table 1000 and determines an output port 208 based on the flow attribute specified by the application determination unit 205. The path determination unit 206 also stores, in the flow table 2000, the flow transfer information in which information indicating the determined output port 208 and the hash value are associated with each other. The path determination unit 206 then notifies the routing unit 207 of the entry (flow transfer information) stored in the flow table 2000.

The routing unit 207 acquires output port information that is included in the entry (flow transfer information) of which the routing unit 207 has been notified by the flow information acquisition unit 204 or the path determination unit 206. The routing unit 207 then transmits the packet to the output port 208 indicated by the acquired output port information.

The output ports 208 output packets received from the routing unit 207. Here, the output ports 208 are provided for the respective second packet transfer devices 30, for example. For example, the output ports 208 include an output port 208-1, which corresponds to the second packet transfer device 30-1, an output port 208-2, which corresponds to the second packet transfer device 30-2, and so on. Note that the output ports 208 may be physical ports, or may be logical ports.

Here, the ECMP path table 1000 according to Example 1 will be described with reference to FIG. 3. FIG. 3 shows an example of the ECMP path table 1000 according to Example 1.

As shown in FIG. 3, the ECMP path table 1000 according to Example 1 stores pieces of path information as entries. The path information includes a "destination network", a "subnet mask", a "gateway list", "output port information", a "load state in terms of data volume (bps)", and a "load state in terms of number of packets (pps)".

An IP address of a network to which a packet is to be transferred, or default is set as the "destination network". A subnet mask that corresponds to the destination network is set as the "subnet mask".

An IP address of a gateway (second packet transfer device 30) that corresponds to the destination network is set in the "gateway list". Note that, in the "gateway list", IP addresses of one or more gateways are set for one destination network.

Information that indicates the output port 208 that corresponds to (the IP address of) each of the gateways set in the "gateway list" is set as the "output port information".

In the example shown in FIG. 3, "eth0", which indicates the output port 208-1, is associated with a gateway "192.168.1.0". This indicates that, when a packet is transmitted from the gateway "192.168.1.0", this packet is transmitted from the output port "208-1".

Similarly, for example, "eth1", which indicates the output port 208-2, is associated with the gateway "192.168.1.1". This indicates that, when a packet is transmitted from the gateway "192.168.1.1", the packet is transmitted from the output port 208-2. The same applies to the other gateways.

As the "load state in terms of data volume (bps)", a load state in terms of data volume (bps) of a gateway is set for (an IP address of) each of the gateways set in the "gateway list".

Here, in the example shown in FIG. 3, if "0" is set as the "load state in terms of data volume (bps)", it indicates that the load state in terms of data volume (bps) of a corresponding gateway is a "low load". On the other hand, if "1" is set as the "load state in terms of data volume (bps)", it indicates that the load state in terms of data volume (bps) of a corresponding gateway is a "high load".

As the "load state in terms of the number of packets (pps)", a load state in terms of the number (pps) of a gateway is set for (an IP address of) each of the gateways set in the "gateway list". Here, in the example shown in FIG. 3, if "0" is set as the "load state in terms of the number of packets (pps)", it indicates that the load state in terms of the number of packets (pps) of a corresponding gateway is a "low load". On the other hand, if "1" is set as the "load state in terms of the number of packets (pps)", it indicates that the load state in terms of the number of packets (pps) of a corresponding gateway is a "high load".

Thus, the ECMP path table 1000 according to Example 1 stores path information that includes, for each destination network, one or more gateways for each destination network, as well as the output port information and the load state of each of these gateways.

As will be described later, in Example 1, if the load state of each of the gateways (second packet transfer devices 30) exceeds (or falls below) a threshold, load distribution is carried out by changing the load state corresponding to the gateway, and transmitting, when a packet is transferred, the packet from a gateway in a low-load state in accordance with the flow attribute.

Processing to Change ECMP Path Tables

Figure 4:
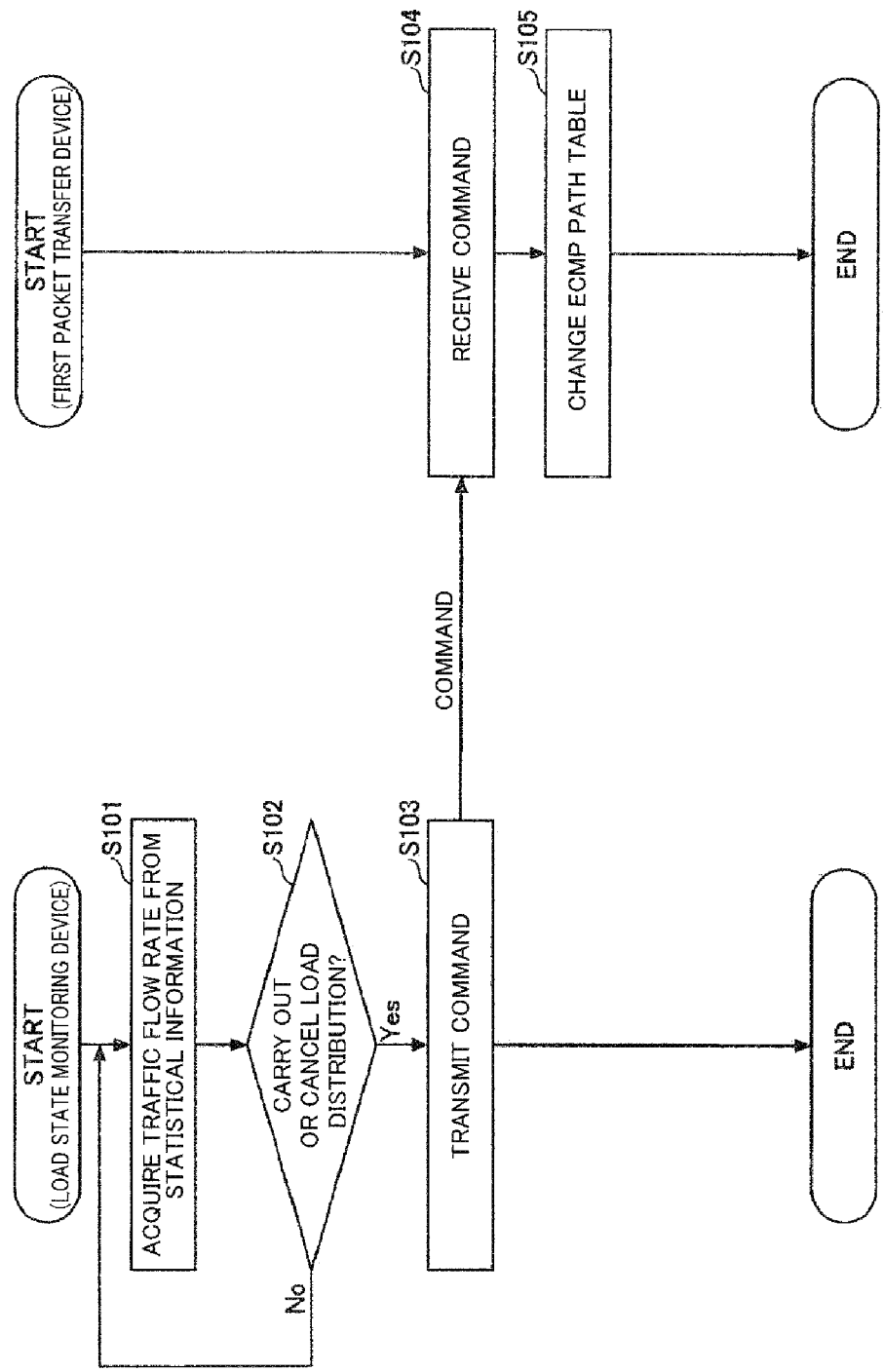
FIG. 4 is a diagram for illustrating an example flow of processing to change the ECMP path table according to Example 1.

Processing to change the ECMP path tables 1000 according to Example 1 will be described below with reference to FIG. 4. FIG. 4 is a diagram for illustrating an example flow of the processing to change the ECMP path table 1000 according to Example 1.

First, the flow rate monitoring unit 101 of the load monitoring device 10 acquires the bps result values and the pps result values for the second packet transfer devices 30 from the statistical information regarding the second packet transfer devices 30 (step S101). Here, for example, the flow rate monitoring unit 101 acquires the bps result values and the pps result values for the second packet transfer devices 30 every predetermined time. Note that the statistical information can be acquired using netstat or the like, for example.

Next, the load distribution determination unit 102 of the load monitoring device 10 determines whether to carry out or cancel load distribution (step S102). That is to say, the load distribution determination unit 102 determines whether each of the bps result values exceeds or falls below the bps threshold. Similarly, the load distribution determination unit 102 determines whether each of the pps result values exceeds or falls below the pps threshold. Note that the bbs threshold and the pps threshold may be determined as the same value for all of the second packet transfer devices 30, or may be determined for each of the second packet transfer devices 30. Alternatively, for example, one or more second packet transfer devices 30 may be grouped by predetermined criteria, and the values may be determined for each of the groups.

If it is determined that any of the bps result values exceeds the bps threshold, the load distribution determination unit 102 determines to carry out load distribution. On the other hand, if it is determined that any of the bps result values falls below the bps threshold, the load distribution determination unit 102 determines to cancel load distribution.

Similarly, if it is determined that any of the pps result values exceeds the pps threshold, the load distribution determination unit 102 determines to carry out load distribution. On the other hand, if it is determined that any of the pps result values falls below the pps threshold, the load distribution determination unit 102 determines to cancel load distribution.

If, in step S102, it is not determined to carry out or cancel load distribution, the load monitoring device 10 returns to step S101 above.

On the other hand, if, in step S102, it is determined to at least either carry out or cancel load distribution, the command transmission unit 103 of the load monitoring device 10 transmits a predetermined command to the first packet transfer device 20 (step S103).

The command receiving unit 201 of the first packet transfer device 20 receives the command from the load monitoring device 10 (step S104).

Next, the path table change unit 202 of the first packet transfer device 20 changes the ECMP path table 1000 in accordance with the command received by the command receiving unit 201 (step S105).

Specifically, for example, if a notification has been received in which "bps threshold", "carry out load distribution", and "192.168.1.0" are set, respectively, as the "threshold type", the "command type", and the "target device identification information", the path table change unit 202 changes the "load state in terms of data volume (bps)" of the gateway with the IP address "192.168.1.0" to "1", in each of the entries in the ECMP path table 1000.

Similarly, for example, if a notification has been received in which "bps threshold", "cancel load distribution", and "192.168.1.2" are set, respectively, as the "threshold type", the "command type", and the "target device identification information", the path table change unit 202 changes the "load state in terms of data volume (bps)" of the gateway with the IP address "192.168.1.2" to "0", in each of the entries in the ECMP path table 1000.

Similarly, for example, if a notification has been received in which "pps threshold", "carry out load distribution", and "192.168.1.1" are set, respectively, as the "threshold type", the "command type", and the "target device identification information", the path table change unit 202 changes the "load state in terms of the number of packets (pps)" of the gateway with the IP address "192.168.1.1" to "1", in each of the entries in the ECMP path table 1000.

Similarly, for example, if a notification has been received in which "pps threshold", "carry out load distribution", and "192.168.1.0" are set, respectively, as the "threshold type", the "command type", and the "target device identification information", the path table change unit 202 changes the "load state in terms of the number of packets (pps)" of the gateway with the IP address "192.168.1.0" to "0", in each of the entries in the ECMP path table 1000.

As described above, in the load distribution system 1 according to Example 1, if any of the bps result values or the pps result values of the second packet transfer devices 30, which are subjected to load distribution, exceeds or falls below the threshold, the load state of these second packet transfer devices 30 is changed in each of the entries stored in the ECMP path table 1000. Thus, the load state (the load state in terms of data volume (bps) and the load state in terms of the number of packets (pps)) of each of the second packet transfer devices 30 is managed by the entries stored in the ECMP path table 1000.

Packet Transfer Processing

Figure 5:
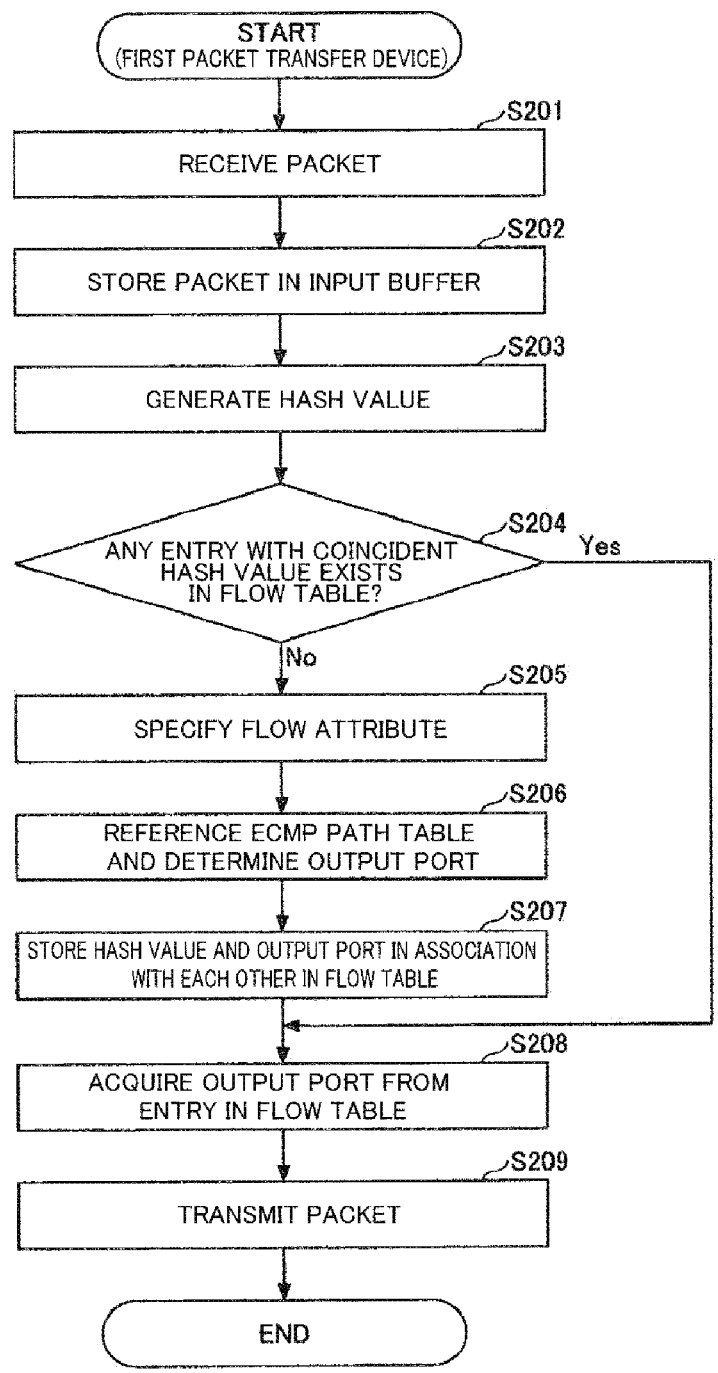
FIG. 5 is a diagram for illustrating an example flow of packet transfer processing according to Example 1.

Packet transfer processing according to Example 2 will be described below with reference to FIG. 5. FIG. 5 is a diagram for illustrating an example flow of packet transfer processing according to Example 1.

First, the input port 203 of the first packet transfer device 20 receives a packet from the network N1 (step S201).

Next, the input port 203 of the first packet transfer device 20 stores the packet received in step S201 above in the input buffer 209 (step S202).

Next, the flow information acquisition unit 204 of the first packet transfer device 20 generates a hash value based on the flow information (e.g. 5-tuple) regarding the packet stored in the input buffer 209 (step S203). Note that any hash function may be used to generate a hash value.

Next, the flow information acquisition unit 204 of the first packet transfer device 20 determines whether or not an entry (flow transfer information) including a hash value that coincides with the hash value generated in step S203 is stored in the flow table 2000 (step S204).

If, in step S204, it is determined that a corresponding entry is stored in the flow table 2000, the first packet transfer device 20 proceeds to processing in later-described step S208.

On the other hand, if, in step S204, it is determined that no corresponding entry is stored in the flow table 2000, the application determination unit 205 of the first packet transfer device 20 specifies the flow attribute of the packet, using 5-tuple or L7 information (step S205). That is to say, the application determination unit 205 specifies whether the flow attribute of the flow of the packet is a "high-bps flow" or a "high-pps flow". For example, the flow attribute can be specified by determining the type of the application that is to handle this flow, using a protocol type included in 5-tuple, application information included in L7 information, or the like.

Next, the path determination unit 206 of the first packet transfer device 20 references the ECMP path table 1000 and determines an output port 208 based on the flow attribute specified in step S205 above (step S206). For example, the path determination unit 206 determines an output port 208 through the following procedure S1 to S3.

S1) First, the path determination unit 206 searches the ECMP path table 1000 for an entry that corresponds to the network address of the destination IP address included in 5-tuple that the path determination unit 205 has been notified by the application determination unit 205. At this time, the path determination unit 206 searches for the entry using longest match, for example. If an entry that corresponds to the network address is found, the path determination unit 206 references this entry. On the other hand, if an entry that corresponds to the network address is not found, the path determination unit 206 references an entry in which "default" is set as the destination network.

S2) Next, the path determination unit 206 searches for a gateway in a low-load state in the "gateway list" included in the referenced entry, in accordance with the flow attribute.

For example, if the flow attribute specified in step S205 above is a "high-bps flow", the path determination unit 206 searches for gateways for which "0" is set as the "load state in terms of data volume (bps), in descending order in the "gateway list" included in the entry.

On the other hand, if, for example, the flow attribute specified in step S205 above is a "high-pps flow", the path determination unit 206 searches for gateways for which "0" is set as the "load state in terms of the number of packets (pps), in the descending order in the "gateway list" included in the entry.

S3) The path determination unit 206 then determines the output port 208 indicated by the output port information that corresponds to the gateway found in S2 above as the output port 208 for the packet.

Note that if no gateway is found in S2 above, the path determination unit 206 determines the output port 208 indicated by the output port information that corresponds to a gateway in a high-load state as the output port 208 for the packet. For example, if the flow attribute specified in step S205 above is a "high-bps flow", and a gateway for which "0" is set as the "load state in terms of data volume (bps)" does not exist, the path determination unit 206 determines the output port 208 indicated by the output port information that corresponds to a gateway for which "1" is set as the "load state in terms of data volume (bps)" as the output port 208 for the packet. Similarly, if, for example, the flow attribute specified in step S205 is a "high-pps flow", and a gateway for which "0" is set as the "load state in terms of the number of packets (pps)" does not exist, the path determination unit 206 determines the output port 208 indicated by the output port information that corresponds to a gateway for which "1" is set as the "load state in terms of the number of packets (pps)" as the output port 208 for the packet.

Here, if the output port 208 for the same destination network is to be changed through round-robin, the path determination unit 206 may move the gateway that corresponds to the determined output port 208 to the backend of the "gateway list". For example, regarding the ECMP path table 1000 shown in FIG. 3, if the output port information "eth0" regarding a gateway "192.168.1.0" to the destination network "default" is determined as an output port 208, this gateway "192.168.1.0" may be moved to the backend of the list (i.e. this gateway "192.168.1.0" may come after the gateway "192.168.1.2"). Thus, further load distribution can be expected by changing the output port 208 for the same destination network through round-robin.

Next, the path determination unit 206 of the first packet transfer device 20 stores, in the flow table 2000, flow transfer information in which the hash value that the path determination unit 206 has been notified by the application determination unit 205 and information (output port information) indicating the output port 208 determined in step S206 above are associated with each other (step S207).

The routing unit 207 of the first packet transfer device 20 acquires the output port information from the corresponding entry (the entry regarding which it has been determined in step S204 above that the hash value thereof coincides, or the entry stored in step S207) (step S208). The routing unit 207 then transmits the packet to the output port 208 indicated by the acquired output port information.

The output port 208 of the first packet transfer device 20 outputs the packet received from the routing unit 207 (step S209).

As described above, in the load distribution system 1 according to Example 1, when a packet is transferred from the first packet transfer device 20 to a second packet transfer device 30, this packet is transferred to a second packet transfer device 30 in a low-load state, in accordance with the flow attribute of the flow of the packet. Thus, in the load distribution system 1 according to Example 1, load distribution between the second packet transfer devices 30 can be realized. Accordingly, for example, it is possible to prevent a situation where packets in a high-bps flow are concentrated on a certain second packet transfer device 30 and a situation where packets in a high-pps flow are concentrated thereon, and the transfer capacity of the second packet transfer devices 30 can be fully utilized.

Example 2

Example 2 of the load distribution system 1 according to the embodiment of the present invention will be described below. Note that Example 2 will mainly describe differences from Example 1, and descriptions of the same constituent elements as those in Example 1 are omitted, as appropriate.

Functional Configuration

Figure 6:
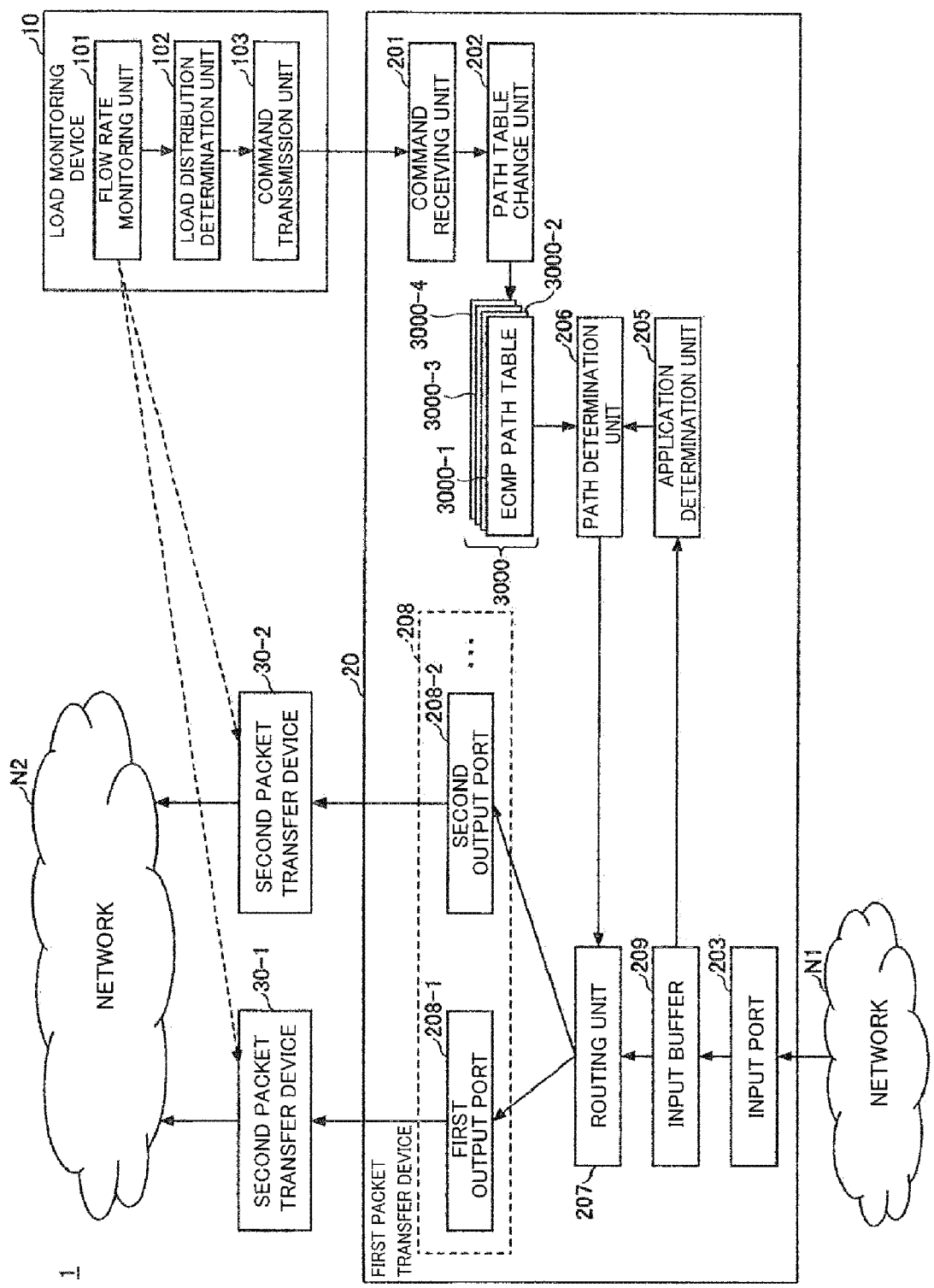
FIG. 6 is a diagram showing an example of a functional configuration of a load distribution system according to Example 2.

First, a functional configuration of the load distribution system 1 according to Example 2 will be described with reference to FIG. 6. FIG. 6 shows an example of a functional configuration of the load distribution system 1 according to Example 2. Note that the functional configuration of the load monitoring device 10 according to Example 2 is the same as that in Example 1, and descriptions thereof are omitted.

As shown in FIG. 6, the first packet transfer device 20 according to Example 2 has a command receiving unit 201, a path table change unit 202, an input port 203, an application determination unit 205, a path determination unit 206, a routing unit 207, output ports 208, and an input buffer 209. Of these functional units, the functions of the path table change unit 202, the application determination unit 205, the path table change unit 206, and the routing unit 207 differ from those in Example 1. Therefore, these functional units will be described below.

The path table change unit 202 changes ECMP path tables 3000 in accordance with a command received by the command receiving unit 201. The ECMP path tables 3000 include four tables, namely an ECMP path table 3000-1, an ECMP path table 3000-2, an ECMP path table 3000-3, and an ECMP path table 3000-4.

The ECMP path table 3000-1 is a table that stores pieces of high-priority path information, of path information for high-bps flows, as entries. The ECMP path table 3000-2 is a table that stores pieces low-priority path information, of path information for high-bps flows, as entries. The ECMP path table 3000-3 is a table that stores pieces of high-priority path information, of path information for high-pps flows, as entries. The ECMP path table 3000-4 is a table that stores pieces of low-priority path information, of path information for low-pps flows, as entries. Note that the high-priority and the low-priority refer to the priority that is referenced to determine an output port 208, and high-priority entries are preferentially referenced over low-priority entries. The details of the ECMP path tables 3000 according to Example 2 will be described later.

The application determination unit 205 specifies an application for a flow of a packet, using the flow information (e.g. 5-tuple) regarding the packet or L7 information (e.g. L7 header information etc.) regarding the packet stored in the input buffer 209, and specifies the flow attribute of this flow (either a high-bps flow or a high-pps flow). The application determination unit 205 then notifies the path determination unit 206 of the specified flow attribute. At this time, the application determination unit 205 notifies the path determination unit 206 of 5-tuple and the flow attribute, for example.

The path determination unit 206 references the ECMP path tables 3000 and determines an output port 208 based on the flow attribute specified by the application determination unit 205. The path determination unit 206 also notifies the routing unit 207 of information (output port information) that indicates the determined output port 208.

The routing unit 207 transmits the packet to the output port 208 indicated by the output port information of which the routing unit 207 has been notified by the path determination unit 206.

Figure 7:
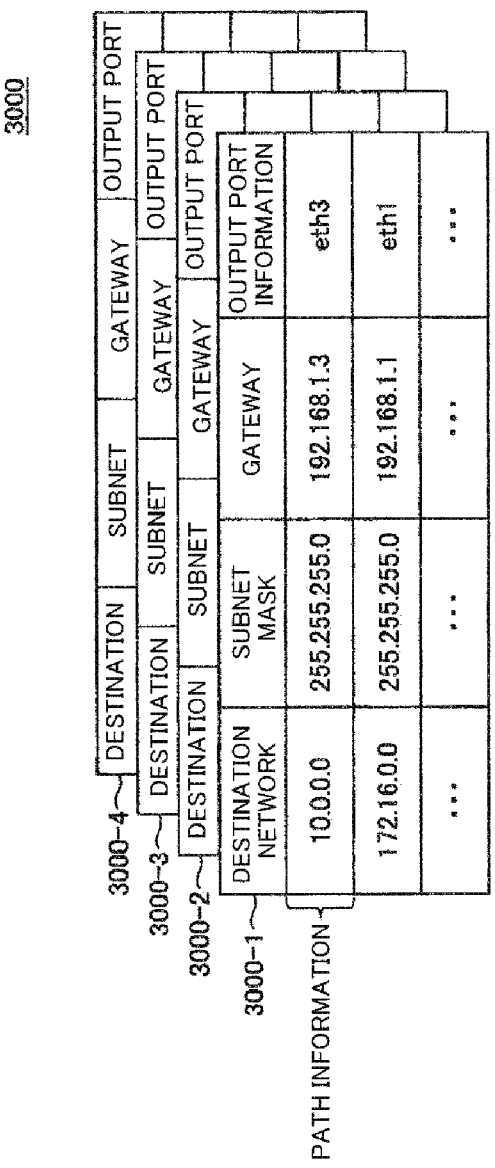
FIG. 7 is a diagram showing an example of an ECMP path table according to Example 2.

Here, the ECMP path tables 3000 according to Example 2 will be described with reference to FIG. 7. FIG. 7 shows an example of the ECMP path table 3000 according to Example 2.

As shown in FIG. 7, the ECMP path tables 3000 according to Example 2 include four tables, namely the ECMP path table 3000-1, the ECMP path table 3000-2, the ECMP path table 3000-3, and the ECMP path table 3000-4. Also, the ECMP path tables 3000 store pieces of path information as entries. The path information includes a "destination network", a "subnet mask", a "gateway", and "output port information".

An IP address of a network to which a packet is to be transferred is set as the "destination network". A subnet mask that corresponds to the destination network is set as the "subnet mask".

An IP address of a gateway (second packet transfer device 30) that corresponds to the destination network is set as the "gateway".

Information that indicates an output port 208 for (the IP address of) the gateway that is set as the "gateway" is set as the "output port information".

Thus, the ECMP path tables 3000 according to Example 2 store path information that includes, for each destination network, a gateway for the destination network, and the output port information regarding this gateway.

As will be described later, in Example 2, if the load state of any gateway (second packet transfer device 30) exceeds (or falls below) a threshold, load distribution is carried out by changing the table in which the path information including the IP address of this gateway is stored is stored, and transmitting, when a packet is transferred, the packet from a gateway in a low-load state in accordance with the flow attribute.

Processing to Change ECMP Path Tables

Figure 8:
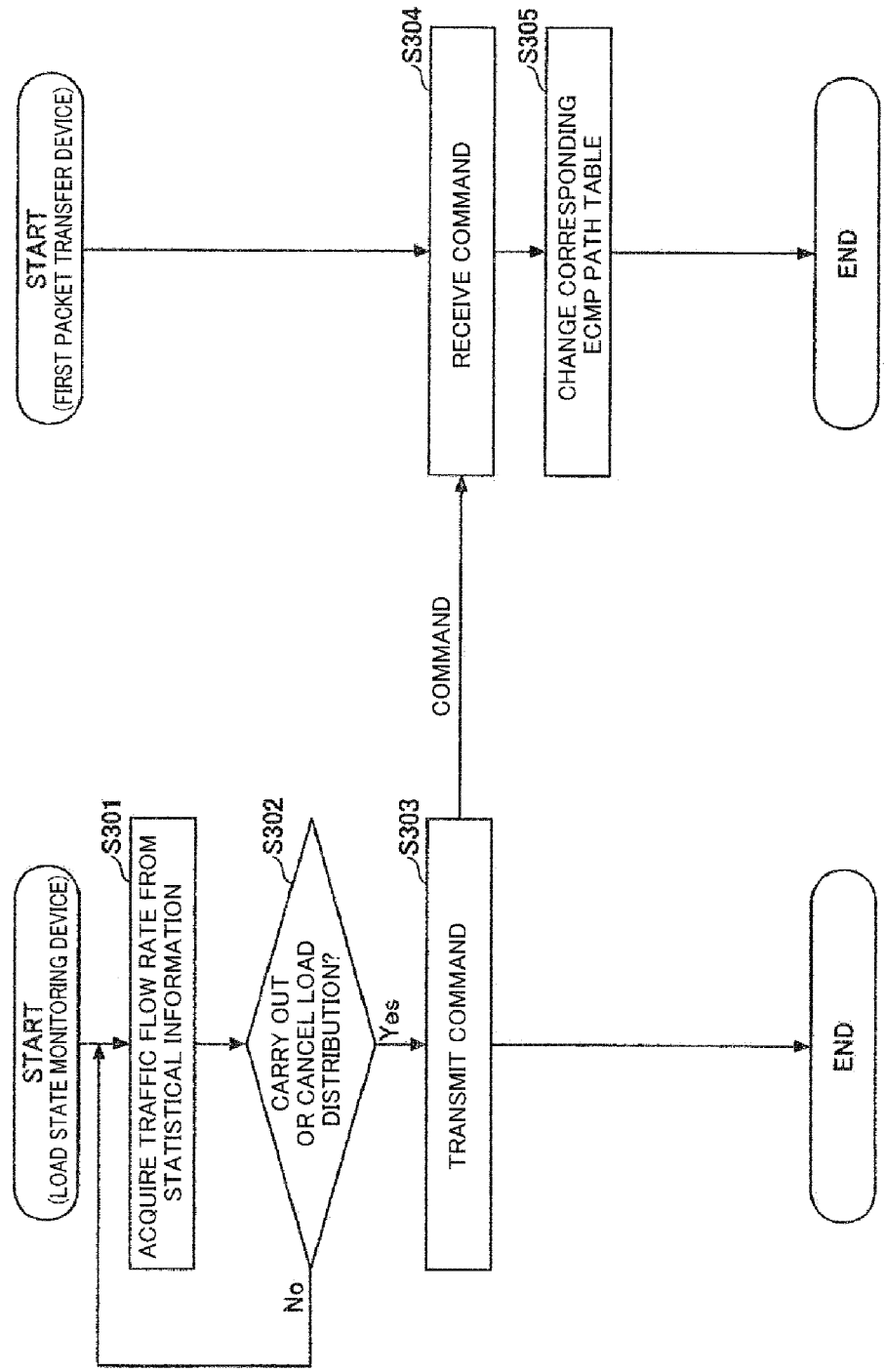
FIG. 8 is a diagram for illustrating an example flow of processing to change the ECMP path table according to Example 2.

Processing to change the ECMP path tables 3000 according to Example 2 will be described below with reference to FIG. 8. FIG. 8 is a diagram for illustrating an example flow of the processing to change the ECMP path tables 3000 according to Example 2. Note that processing in steps S301 to S304 in FIG. 8 is the same as processing steps S101 to S104 in FIG. 4, respectively, and descriptions thereof are omitted accordingly.

Subsequent to step S304, the path table change unit 202 of the first packet transfer device 20 changes the ECMP path tables 3000 in accordance with the command received by the command receiving unit 201 (step S305).

Specifically, it is assumed, for example, that a notification is received in which "bps threshold", "carry out load distribution", and "192.168.1.0" are set, respectively, as the "threshold type", the "command type", and the "target device identification information". In this case, the path table change unit 202 deletes, from the ECMP path table 3000-1, the path information in which the network address that corresponds to the IP address "192.168.1.0" is set as the "destination network", and then adds the deleted path information to the ECMP path table 3000-2. In other words, the path table change unit 202 changes the priority of this path information from high priority to low priority.

Similarly, it is assumed, for example, that a notification is received in which "bps threshold", "cancel load distribution", and "192.168.1.2" are set, respectively, as the "threshold type", the "command type", and the "target device identification information". In this case, the path table change unit 202 deletes, from the ECMP path table 3000-2, the path information in which the network address that corresponds to the IP address "192.168.1.2" is set as the "destination network", and then adds the deleted path information to the ECMP path table 3000-1. In other words, the path table change unit 202 changes the priority of this path information from low priority to high priority.

Similarly, it is assumed, for example, that a notification is received in which "pps threshold", "carry out load distribution", and "192.168.1.1" are set, respectively, as the "threshold type", the "command type", and the "target device identification information". In this case, the path table change unit 202 deletes, from the ECMP path table 3000-3, the path information in which the network address that corresponds to the IP address "192.168.1.1" is set as the "destination network", and then adds the deleted path information to the ECMP path table 3000-4. In other words, the path table change unit 202 changes the priority of this path information from high priority to low priority.

Similarly, it is assumed, for example, that a notification is received in which "bps threshold", "cancel load distribution", and "192.168.1.2" are set, respectively, as the "threshold type", the "command type", and the "target device identification information". In this case, the path table change unit 202 deletes, from the ECMP path table 3000-4, the path information in which the network address that corresponds to the IP address "192.168.1.2" is set as the "destination network", and then adds the deleted path information to the ECMP path table 3000-3. In other words, the path table change unit 202 changes the priority of this path information from low priority to high priority.

As described above, in the load distribution system 1 according to Example 2, if the bps result value or the pps result value of any of the second packet transfer devices 30, which are subjected to load distribution, exceeds or falls below the threshold, the priority of a corresponding entry, of the entries stored in the ECMP path table 3000 for high-bps flows or the ECMP path table 3000 for high-pps flows is changed in accordance with the bps result value or the pps result value.

Packet Transfer Processing

Figure 9:
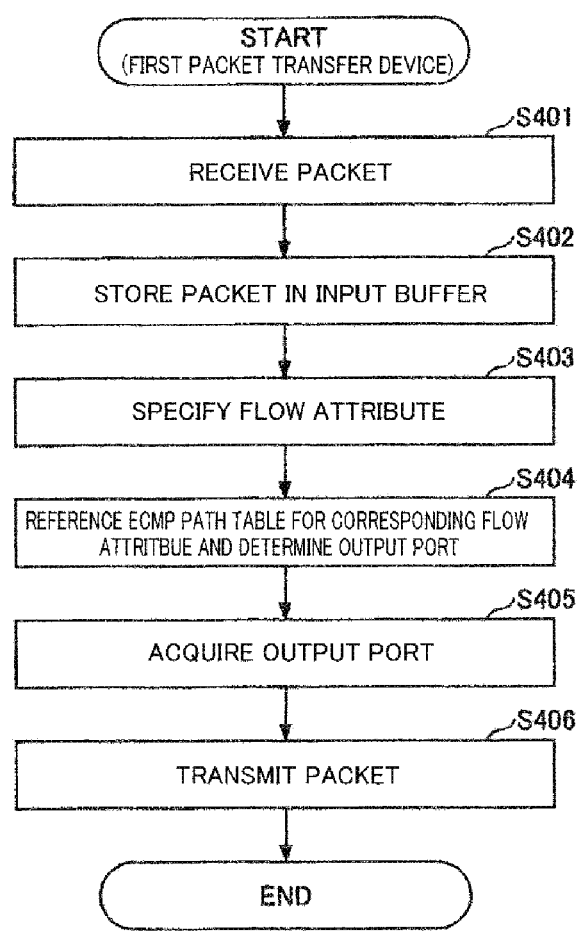
FIG. 9 is a diagram for illustrating an example flow of packet transfer processing according to Example 2.

Packet transfer processing according to Example 2 will be described below with reference to FIG. 9. FIG. 9 is a diagram for illustrating an example flow of packet transfer processing according to Example 2. Note that processing in steps S401 and S402 in FIG. 9 is the same as processing in steps S201 to S202 in FIG. 5, respectively, and descriptions thereof are omitted accordingly.

Subsequent to step S202, the application determination unit 205 of the first packet transfer device 20 specifies the flow attribute of the flow of the packet (either a high-bps flow or a high-pps flow), using flow information (e.g. 5-tuple) regarding the packet or L7 information (e.g. L7 header information etc.) regarding the packet stored in the input buffer 209 (step S403).

Next, the path determination unit 206 of the first packet transfer device 20 references a corresponding one of the ECMP path tables 3000, and determines an output port 208 (step S404).

For example, if the flow attribute specified in step S403 above is a "high-bps flow", the path determination unit 206 references the ECMP path table 3000-1, and determines whether or not an entry exists in which a network address that corresponds to the destination IP address of the packet is set as the "destination network".

If it is determined that a corresponding entry exists in the ECMP path table 3000-1, the path determination unit 206 determines, as an output port 208 for the packet, the output port 208 indicated by the output port information that is set as the "output port information" in this entry. Note that if there are a plurality of entries in which the network address that corresponds to the destination IP address of the packet is set as the "destination network", the path determination unit 206 may determine one output port using the output port information that is set as the "output port information" in the plurality of entries through round-robin.

On the other hand, if it is determined that a corresponding entry does not exist in the ECMP path table 3000-1, the path determination unit 206 references the ECMP path table 3000-2, and determines whether or not an entry exists in which the network address that corresponds to the destination IP address of the packet is set as the "destination network".

If it is determined that a corresponding entry exists in the ECMP path table 3000-2, the path determination unit 206 determines, as an output port 208 for the packet, the output port 208 indicated by the output port information that is set as the "output port information" in this entry. Note that if there are a plurality of entries in which the network address that corresponds to the destination IP address of the packet is set as the "destination network", the path determination unit 206 may determine one output port using the output port information that is set as the "output port information" in the plurality of entries through round-robin.

Note that if it is determined that a corresponding entry does not exist in the ECMP path table 3000-2, the path determination unit 206 may determine, as an output port 208 for the packet, the output port 208 indicated by the output port information that is set as the "output port information" in an entry in which "default" is set as the "destination network".

Similarly, if, for example, the flow attribute specified in step S403 above is a "high-pps flow", the path determination unit 206 references the ECMP path table 3000-3, and determines whether or not an entry exists in which the network address that corresponds to the destination IP address of the packet is set as the "destination network".

If it is determined that a corresponding entry exists in the ECMP path table 3000-3, the path determination unit 206 determines, as an output port 208 for the packet, the output port 208 indicated by the output port information that is set as the "output port information" in this entry. Note that if there are a plurality of entries in which the network address that corresponds to the destination IP address of the packet is set as the "destination network", the path determination unit 206 may determine one output port using the output port information that is set as the "output port information" in the plurality of entries through round-robin.

On the other hand, if it is determined that a corresponding entry does not exist in the ECMP path table 3000-3, the path determination unit 206 references the ECMP path table 3000-4 and determines whether or not an entry exists in which the network address that corresponds to the destination IP address of the packet is set as the "destination network".

If it is determined that a corresponding entry exists in the ECMP path table 3000-4, the path determination unit 206 determines, as an output port 208 for the packet, the output port 208 indicated by the output port information that is set as the "output port information" in this entry. Note that if there are a plurality of entries in which the network address that corresponds to the destination IP address of the packet is set as the "destination network", the path determination unit 206 may determine one output port using the output port information that is set as the "output port information" in the plurality of entries through round-robin.

Note that if it is determined that a corresponding entry does not exist in the ECMP path table 3000-4, the path determination unit 206 may determine, as an output port 208 for the packet, the output port 208 indicated by the output port information that is set as the "output port information" in an entry in which "default" is set as the "destination network".

Next, the routing unit 207 of the first packet transfer device 20 acquires output port information that indicates the output port determined by the path determination unit 206 (step S405). The routing unit 207 then transmits the packet to the output port 208 indicated by the acquired output port information.

The output port 208 of the first packet transfer device 20 outputs the packet received from the routing unit 207 (step S406).

As described above, in the load distribution system 1 according to Example 2, when a packet is transferred from the first packet transfer device 20 to any of the second packet transfer device 30, the ECMP path tables 3000 that correspond to flow attribute of a flow of this packet, of the four ECMP path tables 3000, are referenced in descending order of priority in accordance with the flow attribute. Thus, the packet is transferred to a second packet transfer device 30 in a low-load state. Thus, in the load distribution system 1 according to Example 2, load distribution for the second packet transfer devices 30 can be realized. For this reason, for example, it is possible, similarly to Example 1, to prevent a situation where packets in a high-bps flow are concentrated on a certain second packet transfer device 30 and a situation where packets in a high-pps flow are concentrated thereon, and the transfer capacity of the second packet transfer devices 30 can be fully utilized.

Hardware Configuration

Figure 10:
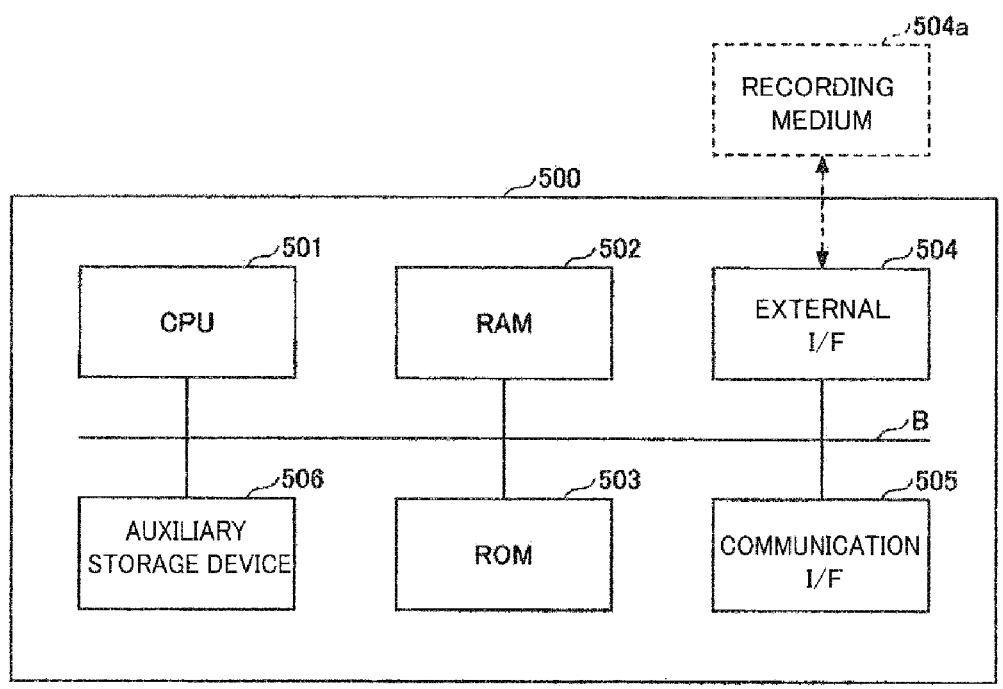
FIG. 10 is a diagram showing an example of a hardware configuration of a computer.

Lastly, a description will be given of hardware configurations of the load monitoring device 10, the first packet transfer device 20, and the second packet transfer devices 30 according to the embodiment of the present invention. The load monitoring device 10, the first packet transfer device 20, and the second packet transfer devices 30 according to the embodiment of the present invention are realized by using one or more computers 500, one of which is shown in FIG. 10, for example. FIG. 10 shows an example of a hardware configuration of the computer 500.

The computer 500 shown in FIG. 10 has a CPU (Central Processing Unit) 501, a RAM 502, a ROM (Read Only Memory) 503, an external I/F 504, a communication I/F 505, and an auxiliary storage device 506. These pieces of hardware are communicably connected to each other via a bus B.

The CPU 501 is a computing device that loads programs and data from the ROM 503, the auxiliary storage device 506, and the like to the RAM 502, and performs processing.

The RAM 502 is a volatile semiconductor memory for temporarily holding programs and data. The ROM 503 is a nonvolatile semiconductor memory capable of holding programs and data even after power is turned off. OS settings, network settings, and the like are stored in the ROM 503, for example.

The external I/F 504 is an interface for an external device. The external device may be a recording medium 504*a* or the like. The computer 500 can read from and write to the recording medium 504*a* or the like, via the external I/F 504.

The recording medium 504*a* may be, for example, a flexible disk, a CD (Compact Disc), a DVD (Digital Versatile Disk), an SD memory card (Secure Digital memory card), a USB (Universal Serial Bus) memory card, or the like.

The communication I/F 505 is an interface for communication with other devices. Note that each of the first packet transfer device 20 and the second packet transfer devices 30 has a plurality of communication I/F 505.

The auxiliary storage device 506 is, for example, an HDD (Hard Disk Drive), an SSD (Solid State Drive), or the like, and is a nonvolatile storage device that stores programs and data. The programs and data stored in the auxiliary storage device 506 may include, for example, an OS, application programs that realize various functions on this OS, and the like.

The load monitoring device 10, the first packet transfer device 20, and the second packet transfer devices 30 according to the embodiment of the present invention can execute the above-described processing by using one or more computers 500, one of which is shown in FIG. 10. For example, the functional units included in the load monitoring device 10 are realized by processing that one or more programs stored in the auxiliary storage device 506 cause the CPU 501 or the like to perform. Also, for example, the functional units included in the first packet transfer device 20 are realized by processing that one or more programs stored in the auxiliary storage device 506 cause the CPU 501 or the like to perform, as well as by the communication I/F 505 or the like.

Note that the load monitoring device 10 may also have at least one of a display device and input devices such as a keyboard and a mouse, for example.

The present invention is not limited to the embodiment that has been specifically disclosed above, and various variations and modifications may be made without departing from the scope of claims. For example, in the above embodiment, the first packet transfer device 20 is a packet transfer device that performs load distribution, and the second packet transfer devices 30 are packet transfer devices that are subjected to load distribution. However, this does not mean that a certain packet transfer device always functions as any of the first packet transfer device 20 and the second packet transfer devices 30. For example, the same packet transfer device may function as the first packet transfer device 20 and also function as one of the second packet transfer devices 30.

REFERENCE SIGNS LIST

1 Load distribution system
10 Load monitoring device
20 First packet transfer device
30 Second packet transfer device
101 Flow rate monitoring unit
102 Load distribution determination unit
103 Command transmission unit
201 Command receiving unit
202 Path table change unit
203 Input port
204 Flow information acquisition unit
205 Application determination unit
206 Path determination unit
207 Routing unit
208 Output port
209 Input buffer
N1, N2 Network

The invention claimed is:

1. A load distribution system comprising:
    determination means, including one or more processors, for determining, upon an input port receiving a packet, a flow attribute indicating whether a flow configured by the packet is a flow that tends to include many long packets or a flow that tends to include many short packets; and
    output means, including one or more processors, for outputting the packet to a particular packet transfer device identified, from among a plurality of packet transfer devices and in accordance with the flow attribute determined by the determination means, as being in a load state indicating that a load applied by the flow of the flow attribute is low.

2. The load distribution system according to claim 1, further comprising:
    monitoring means, including one or more processors, for monitoring a bits per second (bps) value representing a traffic flow rate at each of the plurality of packet transfer devices related to long packets, and a packets per second (pps) value representing a traffic flow rate at each of the plurality of packet transfer devices related to short packets;
    first changing means, including one or more processors, for, if the bps value of at least one of the plurality of packet transfer devices exceeds a predetermined first threshold, changing a load state of the at least one packet transfer device to a load state indicating that a load applied by the flow that tends to include many long packets is high; and
    second changing means, including one or more processors, for, if the pps value of at least one of the plurality of packet transfer devices exceeds a predetermined second threshold, changing a load state of the at least one packet transfer device to a load state indicating that a load applied by the flow that tends to include many short packets is high.

3. The load distribution system according to claim 2, wherein, if the bps value of at least one of the plurality of packet transfer devices falls below the predetermined first threshold, the first changing means changes is configured to change a load state of the at least one packet transfer device to a load state indicating that a load applied by the flow that tends to include many long packets is low, and if the pps value of at least one of the plurality of packet transfer devices falls below the predetermined second threshold, the second changing means is configured to change a load state of the at least one packet transfer device to a load state indicating that a load applied by the flow that tends to include many short packets is low.

4. The load distribution system according to claim 2, wherein the first changing means and the second changing means are configured to change the load state by updating information indicating a load state of each of the plurality of packet transfer devices, or moving identification information regarding each of the plurality of packet transfer devices from a first table to a second table, or from the second table to the first table.

5. The load distribution system according to claim 1, wherein the determination means is configured to determine the flow attribute using at least one of 5-tuple or L7 information regarding the packet.

6. The load distribution system according to claim 1, further comprising:
    hash means, including one or more processors, for generating a hash value based on 5-tuple of the packet received by the input port,
    wherein the output means is configured to reference a table in which the hash value of the 5-tuple of the packet is associated with identification information regarding a packet transfer device that transfers a packet to a network corresponding to a destination IP address included in the 5-tuple, the packet transfer device being the particular packet transfer device, and configured to output the packet to the particular packet transfer device as identified by identification information corresponding to the hash value generated by the hash means.

7. A load distribution method carried out by a load distribution system, the method comprising:
    determining, upon an input port receiving a packet, a flow attribute indicating whether a flow configured by the packet is a flow that tends to include many long packets or a flow that tends to include many short packets; and
    outputting the packet to a particular packet transfer device identified, from among a plurality of packet transfer devices and in accordance with the flow attribute determined during the determining, as being in a load state indicating that a load applied by the flow of the flow attribute is low.

8. The load distribution method according to claim 7, further comprising:
    monitoring a bits per second (bps) value representing a traffic flow rate at each of the plurality of packet transfer devices related to long packets, and a packets per second (pps) value representing a traffic flow rate at each of the plurality of packet transfer devices related to short packets;
    if the bps value of at least one of the plurality of packet transfer devices exceeds a predetermined first threshold, changing a load state of the at least one packet transfer device to a load state indicating that a load applied by the flow that tends to include many long packets is high; and
    if the pps value of at least one of the plurality of packet transfer devices exceeds a predetermined second threshold, changing a load state of the at least one packet transfer device to a load state indicating that a load applied by the flow that tends to include many short packets is high.

9. The load distribution method according to claim 8, further comprising:
    if the bps value of at least one of the plurality of packet transfer devices falls below the predetermined first threshold, changing a load state of the at least one packet transfer device to a load state indicating that a load applied by the flow that tends to include many long packets is low; and
    if the pps value of at least one of the plurality of packet transfer devices falls below the predetermined second threshold, changing a load state of the at least one packet transfer device to a load state indicating that a load applied by the flow that tends to include many short packets is low.

10. The load distribution method according to claim 9, wherein changing the load state of the at least one packet transfer device comprises:
    updating information indicating a load state of each of the plurality of packet transfer devices, or moving identification information regarding each of the plurality of packet transfer devices from a first table to a second table, or from the second table to the first table.

11. The load distribution method according to claim 7, wherein determining the flow attribute comprises:
   using at least one of 5-tuple or L7 information regarding a packet to determine a flow attribute indicating whether a flow configured by the packet is a flow that tends to include many long packets or a flow that tends to include many short packets.

12. A non-transitory computer readable medium storing instructions that when executed by a computer cause the computer to perform a load distribution method comprising:
   determining, upon an input port receiving a packet, a flow attribute indicating whether a flow configured by the packet is a flow that tends to include many long packets or a flow that tends to include many short packets; and
   outputting the packet to a particular packet transfer device identified, from among a plurality of packet transfer devices and in accordance with the flow attribute determined during the determining, as being in a load state indicating that a load applied by the flow of the flow attribute is low.

13. The non-transitory computer readable medium according to claim 12, wherein the load distribution method further comprises:
   monitoring a bits per second (bps) value representing a traffic flow rate at each of the plurality of packet transfer devices related to long packets, and a packets per second (pps) value representing a traffic flow rate at each of the plurality of packet transfer devices related to short packets;
   if the bps value of at least one of the plurality of packet transfer devices exceeds a predetermined first threshold, changing a load state of the at least one packet transfer device to a load state indicating that a load applied by the flow that tends to include many long packets is high; and
   if the pps value of at least one of the plurality of packet transfer devices exceeds a predetermined second threshold, changing a load state of the at least one packet transfer device to a load state indicating that a load applied by the flow that tends to include many short packets is high.

14. The non-transitory computer readable medium according to claim 13, wherein the load distribution method further comprises:
   if the bps value of at least one of the plurality of packet transfer devices falls below the predetermined first threshold, changing a load state of the at least one packet transfer device to a load state indicating that a load applied by the flow that tends to include many long packets is low; and
   if the pps value of at least one of the plurality of packet transfer devices falls below the predetermined second threshold, changing a load state of the at least one packet transfer device to a load state indicating that a load applied by the flow that tends to include many short packets is low.

15. The non-transitory computer readable medium according to claim 14, wherein changing the load state of the at least one packet transfer device comprises:
   updating information indicating a load state of each of the plurality of packet transfer devices, or moving identification information regarding each of the plurality of packet transfer devices from a first table to a second table, or from the second table to the first table.

16. The non-transitory computer readable medium according to claim 12, wherein determining the flow attribute comprises:
   using at least one of 5-tuple or L7 information regarding a packet to determine a flow attribute indicating whether a flow configured by the packet is a flow that tends to include many long packets or a flow that tends to include many short packets.

\* \* \* \* \*